(12) United States Patent
Armbruster et al.

(10) Patent No.: US 7,978,944 B2
(45) Date of Patent: Jul. 12, 2011

(54) LASER LIGHT CABLE

(75) Inventors: Bernd Armbruster, Aichhalden (DE);
Stephan Neuschaefer-Rube,
Schramberg (DE)

(73) Assignee: Trumpf Laser GmbH + Co. KG,
Schramberg (DE)

( * ) Notice: Subject to any disclaimer, the term of this patent is extended or adjusted under 35 U.S.C. 154(b) by 1125 days.

(21) Appl. No.: 11/226,453

(22) Filed: Sep. 15, 2005

(65) Prior Publication Data
US 2006/0062530 A1    Mar. 23, 2006

(30) Foreign Application Priority Data

Sep. 18, 2004  (EP) ..................... 04022260

(51) Int. Cl.
*G02B 6/44*           (2006.01)
(52) U.S. Cl. ....................................... 385/101
(58) Field of Classification Search .................. 385/101
See application file for complete search history.

(56) References Cited

U.S. PATENT DOCUMENTS
4,606,604 A    8/1986  Soodak

FOREIGN PATENT DOCUMENTS
EP    0 486 136 A    5/1992
EP    0 516 931 A   12/1992
EP    1 378 778 A    1/2004

OTHER PUBLICATIONS translation of EP 1 378 778 A1 to Rink (Jan. 7, 2004).*
European Search Report (2 pages).

* cited by examiner

*Primary Examiner* — Jerry T Rahill
(74) *Attorney, Agent, or Firm* — Fish & Richardson P.C.

(57) ABSTRACT

A laser light cable includes an optical fiber and a wire cladding that surrounds the optical fiber and is electrically conductive in the longitudinal direction of the laser light cable. The wire cladding includes a continuous layer of axially-adjacent wires formed from a wire item wrapped around the optical fiber. Axially-adjacent wires of the wire cladding abut in a light-proof manner.

2 Claims, 5 Drawing Sheets

LASER LIGHT CABLE

CROSS REFERENCE TO RELATED APPLICATIONS

This application claims priority under 35 U.S.C. §119(a) to European Patent Application No. 04 022 260.6, filed Sep. 18, 2004, the entire contents of which are hereby incorporated by reference.

TECHNICAL FIELD

This application relates to a laser light cable including an optical fiber and a wire cladding that surrounds the optical fiber and is electrically conductive in the longitudinal direction of the laser light cable.

BACKGROUND

A laser light cable is described, for example, in EP-A-1 378 778. The laser light cable disclosed in EP-A-1 378 778 has a wire cladding in the form of a metallic braided cable sleeving between an inner protective tube and an outer protective metal tube. The metallic braided cable sleeving is electrically insulated from the two protective metal tubes. The inner protective metal tube and the braided cable sleeving are integrated in an electric safety circuit for monitoring the optical fiber. A further outer braided cable sleeving is disposed on the outer protective metal tube. The outer braided cable sleeving counteracts tensile and pressure load exerted on the outer protective metal tube. The inner protective metal tube and the outer braided cable sleeving are integrated in a further electric safety circuit. In the event of damage, when both safety circuits fail, the laser radiation emerging from the optical fiber can penetrate through the protective metal tubes formed as metal coil and through the braided cable sleevings to the outside. Moreover, the manufacture and installation of the braided cable sleeving is relatively expensive.

SUMMARY

In one general aspect, a laser light cable includes an optical fiber and a wire cladding that surrounds the optical fiber and is electrically conductive in the longitudinal direction of the laser light cable. The wire cladding includes a continuous layer of axially-adjacent wires formed from a wire item wrapped around the optical fiber.

Implementations can include one or more of the following features. The wire item may include a single wire wrapped around the optical fiber, or a wire strip having parallel wires wrapped around the optical fiber. At least some of the wires of the wire strip may be electrically conductive. At least some of the wires of the wire strip may include a plastic material having a high melting point.

The axially-adjacent wires of the wire cladding may be produced in such a manner that they abut without forming a gap between them, thus being made impervious to light. Such a design ensures that laser radiation that emerges from the optical fiber when the fiber is damaged is shielded at the wire cladding. Moreover, optical shielding is improved if the wire item is formed from metal. Thus, at least a portion of the axially-adjacent wires may include metal such as, for example, copper or copper-plated steel.

The wire cladding may include two winding layers with opposite winding directions, thereby further improving the light-proof shielding of the laser light cable.

The laser light cable may include an inner metal cladding that surrounds the optical fiber and an electric insulation cladding between the inner metal cladding and the wire cladding. The laser light cable may include a first electric safety circuit connected between the inner metal cladding and the wire cladding. The first electric safety circuit detects damage to a component of the laser light cable such as the optical fiber. The laser light cable may include an outer metal cladding surrounding the wire cladding and an electric insulation cladding between the wire cladding and the outer metal cladding.

The laser light cable may include another, outer wire cladding surrounding the wire cladding. The outer wire cladding is electrically conducting in the longitudinal direction of the laser light cable, and includes a continuous layer of axially-adjacent wires formed from an outer wire item wrapped around the wire cladding.

The outer wire item may include a single wire wrapped around the wire cladding. The outer wire item may include a wire strip including parallel wires wrapped around the optical fiber.

The laser light cable may include an insulation cladding between the wire cladding and the outer wire cladding. Axially-adjacent wires of the outer wire cladding abut in a light-proof manner. At least a portion of the axially-adjacent wires formed from the outer wire item include metal such as copper or copper plated steel. The outer wire cladding may include two winding layers having opposite winding directions. The laser light cable may include an outer metal cladding that surrounds the outer wire cladding, and an outer electric insulation cladding that is disposed between the outer wire cladding and the outer cladding.

The laser light cable may include an inner metal cladding that surrounds the optical fiber and an electric insulation cladding between the inner metal cladding and the wire cladding. The laser light cable may include a second electrical safety circuit connected between the inner metal cladding and the outer wire cladding. The second electric safety circuit detects damage to a component of the laser light cable such as the optical fiber.

The laser light cable may include a continuous metal cladding that is disposed adjacent to the outer metal cladding. The continuous metal cladding electrically shields one or more of the electric safety circuits from the outside and may be electrically insulated from the outer metal cladding.

In another general aspect, a method of making a laser light cable includes winding a wire item around an optical fiber to form a wire cladding having a continuous layer of adjacent wires. The wire cladding is electrically conductive in the longitudinal direction of the laser light cable. The wire item may be a single wire or a wire strip of parallel wires.

The laser light cable is cheaper to manufacture because the wire cladding and the outer wire cladding are more easily formed. Moreover, in comparison with a wire braid (discussed above), the wire cladding may be produced to be light-proof, thus forming a shielding that prevents emergence of laser radiation from the laser light cable in case of damage to the optical fiber.

The features mentioned above and below may be used individually or collectively in arbitrary combination. Other features will be apparent from the description, the drawings, and the claims.

DESCRIPTION OF DRAWINGS

Like reference symbols in the various drawings may indicate like elements.

DETAILED DESCRIPTION

Figure 1:
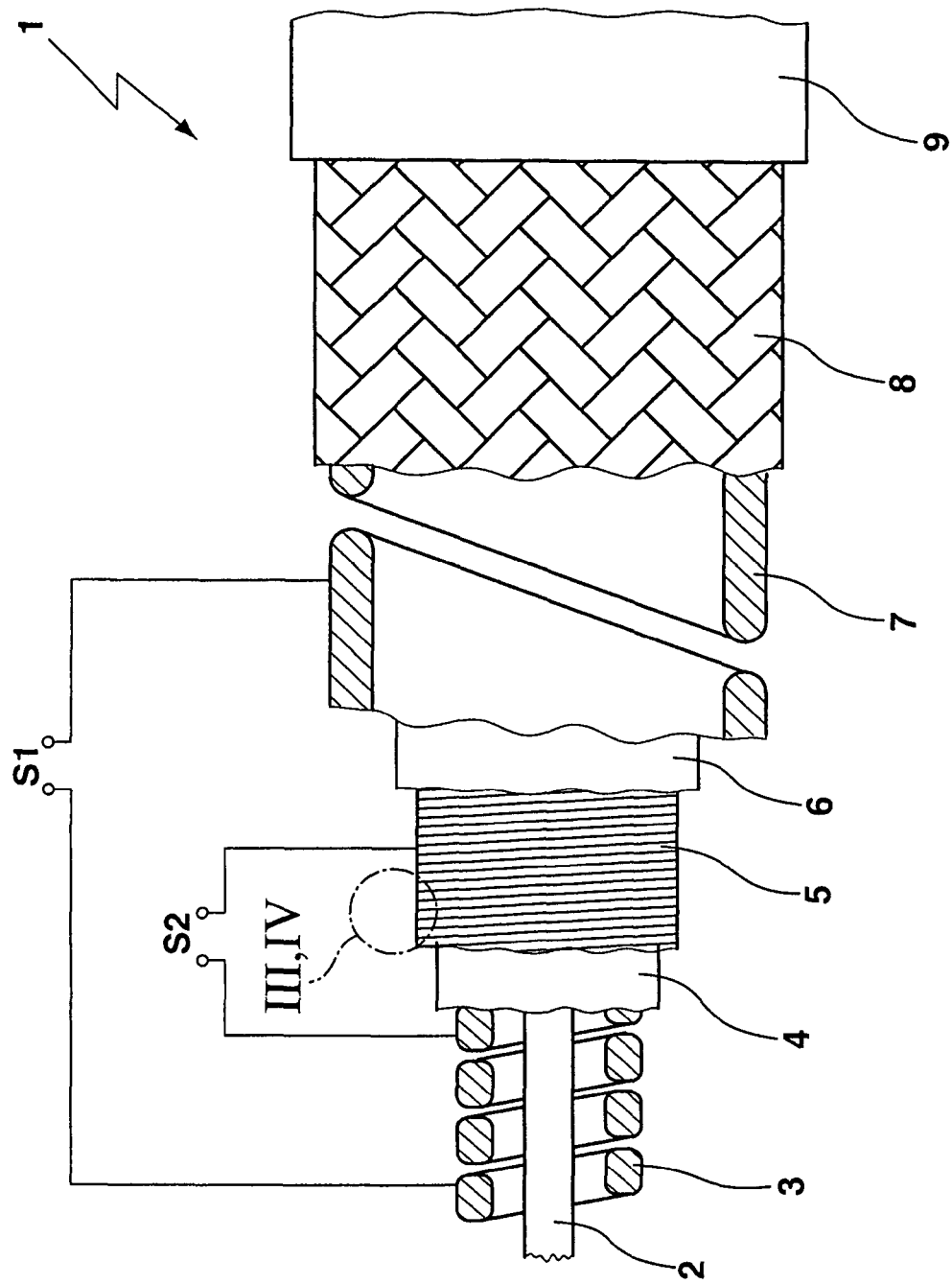
FIG. 1 shows a partial cross sectional view of a first implementation of a laser light cable.

Referring to FIG. 1, a laser light cable 1 includes an optical fiber 2, an inner metal cladding 3 in the form of a metal coil and surrounding the optical fiber 2, an electrically non-conductive insulation cladding 4 surrounding the inner metal cladding 3, a metallic wire cladding 5 surrounding the insulation cladding 4, an electrically non-conducting insulation cladding 6 surrounding the wire cladding 5, an outer metal cladding 7 surrounding the insulation cladding 6, a braided cable sleeving 8 surrounding the outer metal cladding 7, and an outer jacket 9 surrounding the braided cable sleeving 8.

The insulation cladding 4 can be made of, for example, plastic such as PVC. The metallic wire cladding 5 is electrically conductive in the longitudinal direction of the laser light cable. The structure of the metallic wire cladding 5 is described below with reference to FIGS. 3a, 3b, and 4. The insulation cladding 6 can be made of, for example, plastic such as PVC. The outer metal cladding 7 is in the form of a flat strip of metal coil and may be made of stainless steel. The outer jacket 9 is made of, for example, a plastic material and may be extrusion-coated.

The inner metal cladding 3 and the outer metal cladding 7 are integrated in a quiescent electric safety circuit S1. If the inner metal cladding 3 is destroyed due to damage to the optical fiber 2 or due to external influences, current flow through the safety circuit S1 is interrupted and the laser is switched off. In a safety circuit S2, the contact resistance through the insulation cladding 4 between the inner metal cladding 3 and the wire cladding 5 is measured to monitor the optical fiber 2. If the inner metal cladding 3 and hence also the insulation cladding 4 are heated due to damage to the optical fiber 2, the measured resistance decreases. If the measured resistance falls below a threshold, the laser is switched off. Moreover, the capacitance between the inner metal cladding 3 and wire cladding 5 can be continuously monitored using the safety circuit S2.

The outer metal cladding 7 with its braided cable sleeving 8 and the outer jacket 9 also provide mechanical protection for the optical fiber 2 and limit the bending radius of the laser light cable 1. The braided cable sleeving 8 is braided under pre-stress onto the flat strip coil of the outer metal cladding 7. If tensile loading is exerted on the laser light cable 1, the flat strip coil of the outer metal cladding 7 prevents contraction of the braided cable sleeving 8 and ensures sufficient rigidity. When the laser light cable 1 is bent, the braided cable sleeving 8 prevents the windings of the flat strip coil of the outer metal cladding 7 from overlapping thereby preventing the laser light cable 1 from being bent below a lower bending radius.

Figure 2A:
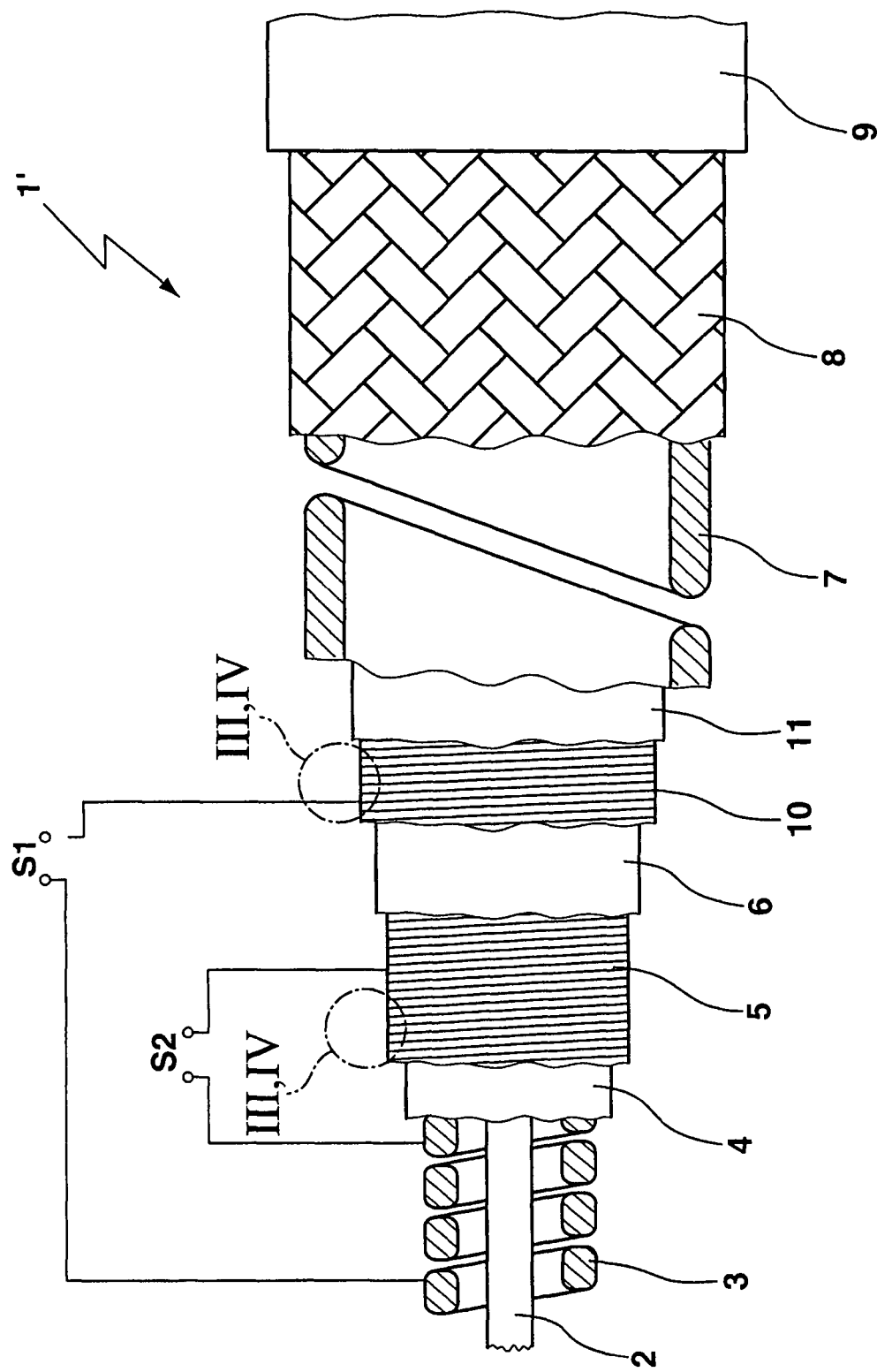
FIGS. 2a-2c show partial cross sectional views of, respectively, second, third, and fourth implementations of a laser light cable.

Referring to FIG. 2a, a laser light cable 1' differs from the laser light cable 1 in that an additional outer wire cladding 10 is disposed between the (inner) wire cladding 5 and the outer metal cladding 7. The outer wire cladding 10 is electrically conducting in the longitudinal direction of the laser light cable. The laser light cable 1' also includes an additional insulation cladding 11 between the outer wire cladding 10 and the outer metal cladding 7. In this way, the outer wire cladding 10 is electrically insulated by the insulation claddings 6, 11.

In the laser light cable 1', the safety circuit S1 is connected between the inner metal cladding 3 and the outer wire cladding 10. Since the braided cable sleeving 8 is not integrated in this safety circuit, the braided cable sleeving 8 and the outer metal cladding 7 may be used as electric shielding for the inner metal cladding 3 and the wire claddings 5, 10 to the outside. This reduces the susceptibility to disturbances of the electric safety circuits.

Figure 2B:
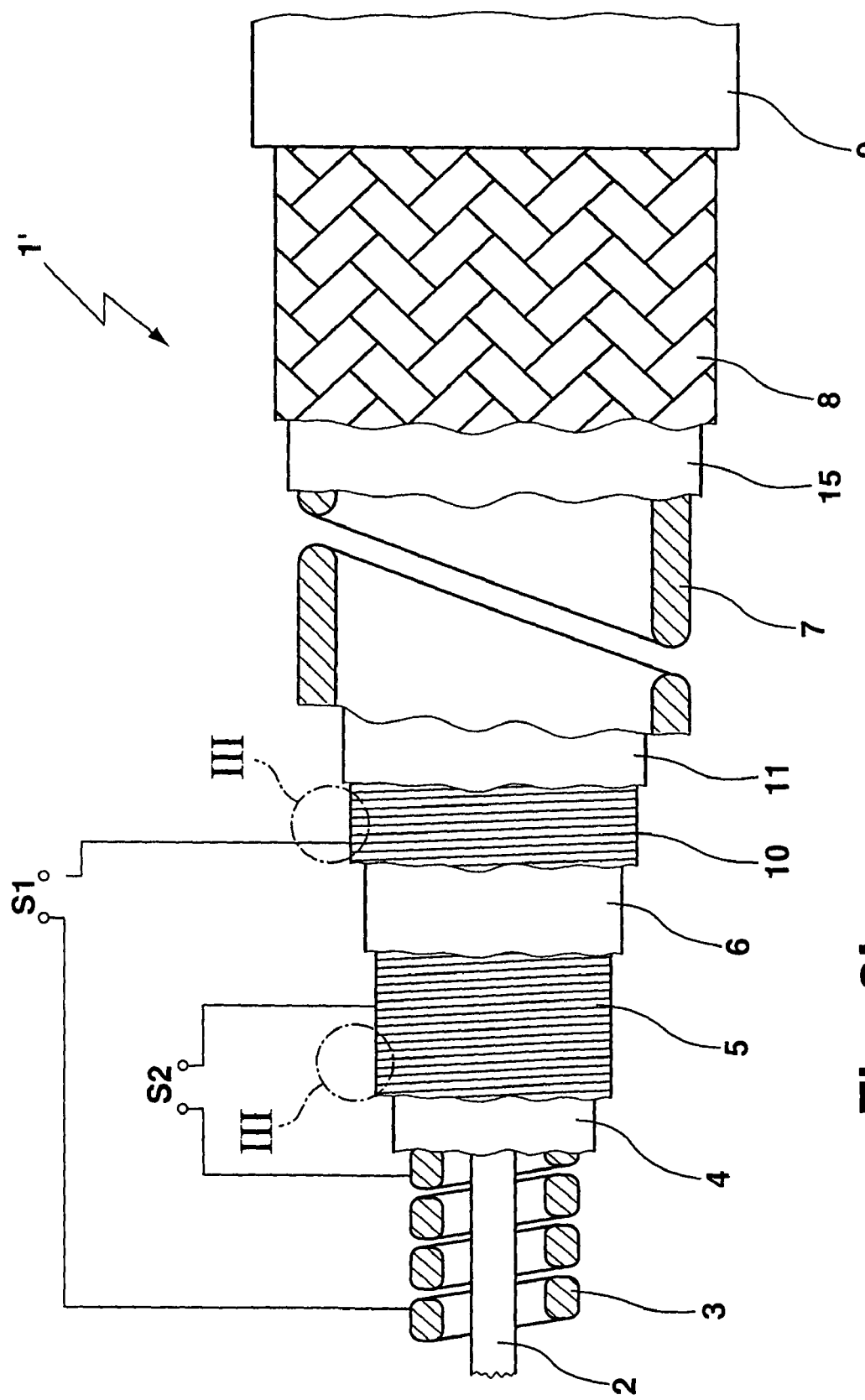
Figure 2C:
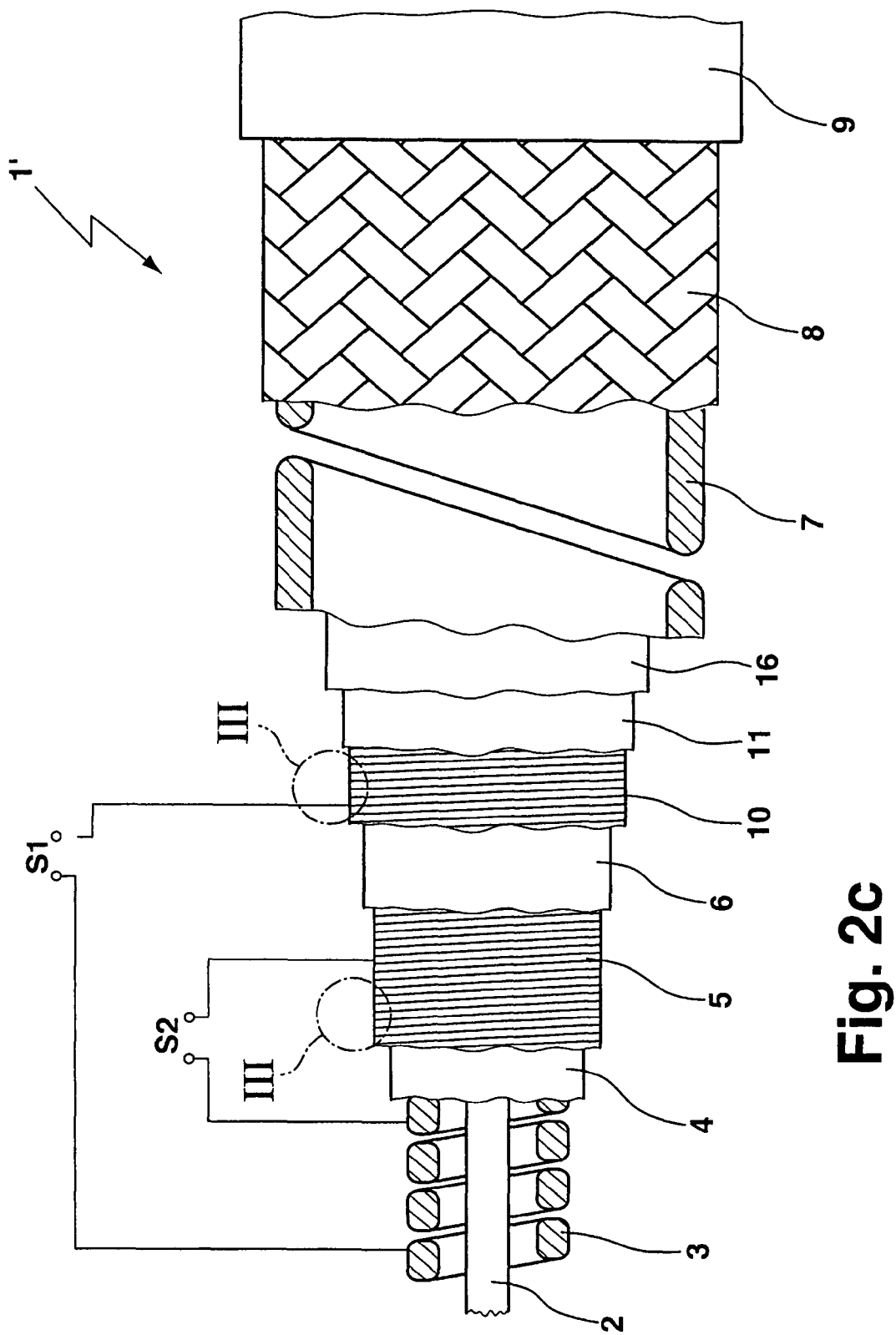

To improve electric shielding to the outside, the laser light cable 1' may include a further metal cladding 15, 16 disposed adjacent to the outer metal cladding 7, on its outside (as shown in FIG. 2b), that is, between the outer metal cladding 7 and the braided cable sleeving 8, or on its inside (as shown in FIG. 2c), that is, between insulation cladding 11 and outer metal cladding 7. The metal cladding 15, 16 is continuous but nevertheless flexible, and it may be insulated from neighboring metallic layers by insulation claddings.

Figure 3A:
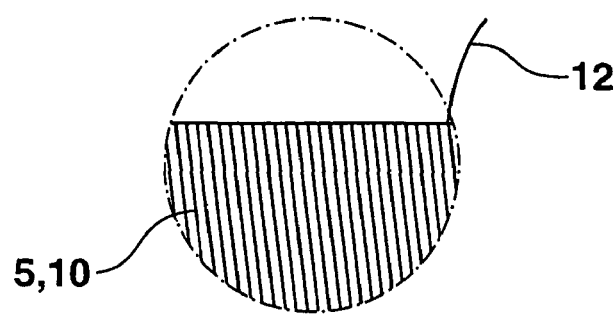
FIG. 3a shows a detailed side view of a wire cladding that is wound from one single wire for use in the laser light cable of any one or more of FIGS. 1 and 2a-2c.
Figure 3B:
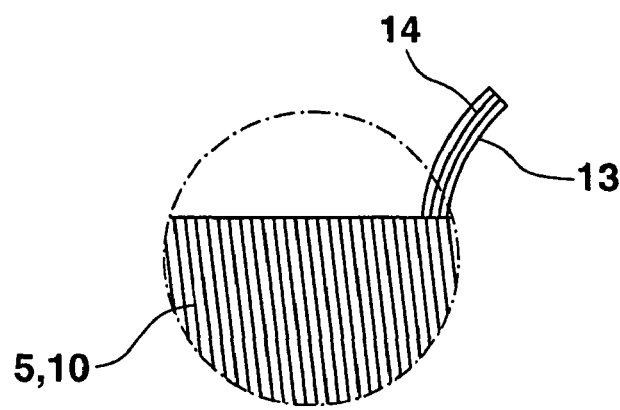
FIG. 3b shows a detailed side view of a wire cladding that is wound from a wire strip for use in the laser light cable of any one or more of FIGS. 1 and 2a-2c.

Referring to FIGS. 3a and 3b, the wire claddings 5, 10 are designed with a continuous layer of axially-adjacent wires formed from a wire item wrapped around the optical fiber 2. In FIG. 3a, the wire item is formed by winding one single wire 12 (for example, a wire made of copper), and in FIG. 3b, the wire item is formed by winding a wire strip 13 that is made of parallel wires 14. The wire 12 and the wire strip 13 are wound onto the insulation cladding 4 or 6 in such a manner that a continuous layer of adjacent wire windings is produced.

Figure 4:
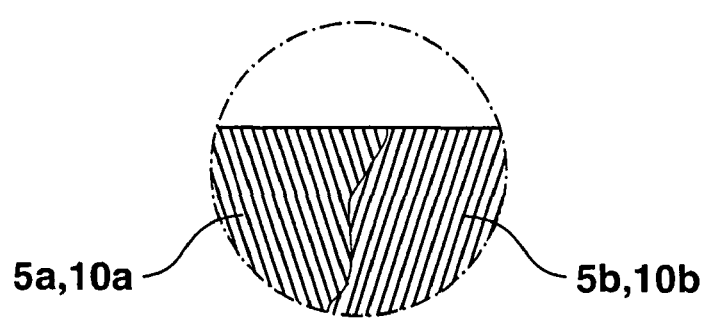
FIG. 4 shows a detailed side view of a wire cladding that is wound from two winding layers for use in the laser light cable of any one or more of FIGS. 1 and 2a-2c.

Referring to FIG. 4, in another implementation, each wire cladding 5, 10 includes two windings 5a, 5b or 10a, 10b that are disposed on top of each other and are wound in different directions. In comparison with a wire braid (discussed above), the wire cladding 5, 10 may be produced to be light-proof, thus forming a shielding that prevents emergence of laser radiation from the laser light cable in case of damage to the optical fiber.

Other implementations are within the scope of the following claims.

What is claimed is:
1. A laser light cable comprising:
an optical fiber;
an inner metal cladding that surrounds the optical fiber;
a wire cladding that surrounds the optical fiber and is electrically conductive in the longitudinal direction of the laser light cable, the wire cladding including a continuous layer of axially-adjacent wires formed from a wire item wrapped around the optical fiber, wherein the axially-adjacent wires of the wire cladding abut in a light-proof manner;
an electric insulation cladding between the inner metal cladding and the wire cladding;
an outer wire cladding that surrounds the wire cladding;
an outer electric insulation cladding between the outer wire cladding and the wire cladding;
an outer metal cladding that surrounds the outer wire cladding;

an additional outer electric insulation cladding between the outer wire cladding and the outer metal cladding;
a first electric safety circuit connected between the inner metal cladding and the wire cladding; and
a second electric safety circuit connected between the inner metal cladding and the outer wire cladding;
wherein one or more of the safety circuits detects damage to a component of the laser light cable.

2. The laser light cable of claim 1, further comprising a continuous metal cladding disposed adjacent to the outer metal cladding, wherein the continuous metal cladding electrically shields one or more of the electric safety circuits to the outside.

* * * * *